(12) United States Patent
Ativanichayaphong et al.

(10) Patent No.: US 8,073,692 B2
(45) Date of Patent: *Dec. 6, 2011

(54) ENABLING SPEECH RECOGNITION GRAMMARS IN WEB PAGE FRAMES

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/917,741

(22) Filed: Nov. 2, 2010

(65) Prior Publication Data

US 2011/0047452 A1 Feb. 24, 2011

Related U.S. Application Data

(63) Continuation of application No. 11/567,235, filed on Dec. 6, 2006, now Pat. No. 7,827,033.

(51) Int. Cl.
*G10L 15/22* (2006.01)
*G06F 17/20* (2006.01)
(52) U.S. Cl. ............. 704/251; 704/270.1; 715/240
(58) Field of Classification Search .......... 704/251, 704/255, 270, 270.1, 275; 715/240
See application file for complete search history.

(56) References Cited

U.S. PATENT DOCUMENTS

| | | | |
|---|---|---|---|
| 6,247,018 B1* | 6/2001 | Rheaume | 715/236 |
| 7,003,550 B1* | 2/2006 | Cleasby et al. | 709/205 |
| 7,177,814 B2* | 2/2007 | Gong et al. | 704/270.1 |
| 7,203,907 B2* | 4/2007 | Weng et al. | 715/748 |
| 7,356,472 B2 | 4/2008 | Cross et al. | |
| 7,401,337 B2 | 7/2008 | Bou-Ghannam et al. | |
| 7,409,690 B2 | 8/2008 | Bou-ghannam et al. | |
| 7,487,085 B2 | 2/2009 | Ativanichayaphong et al. | |
| 7,509,260 B2 | 3/2009 | Cross et al. | |
| 7,548,977 B2 | 6/2009 | Agapi et al. | |
| 7,650,284 B2 | 1/2010 | Cross et al. | |
| 7,739,117 B2 | 6/2010 | Ativanichayaphong et al. | |
| 7,809,575 B2* | 10/2010 | Ativanichayaphong et al. | 704/270 |
| 7,827,033 B2* | 11/2010 | Ativanichayaphong et al. | 704/255 |
| 7,899,915 B2* | 3/2011 | Reisman | 709/228 |
| 7,957,976 B2* | 6/2011 | Cross et al. | 704/275 |
| 7,987,491 B2* | 7/2011 | Reisman | 725/112 |
| 2001/0013001 A1* | 8/2001 | Brown et al. | 704/270.1 |
| 2003/0229900 A1* | 12/2003 | Reisman | 725/87 |

(Continued)

FOREIGN PATENT DOCUMENTS

WO WO 2006108795 10/2006

*Primary Examiner* — Martin Lerner
(74) *Attorney, Agent, or Firm* — Wolf, Greenfield & Sacks, P.C.

(57) ABSTRACT

Enabling grammars in web page frames, including receiving, in a multimodal application on a multimodal device, a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition.

12 Claims, 6 Drawing Sheets

U.S. PATENT DOCUMENTS

| | | | |
|---|---|---|---|
| 2004/0117804 A1* | 6/2004 | Scahill et al. | 719/320 |
| 2004/0133639 A1* | 7/2004 | Shuang et al. | 709/204 |
| 2004/0153323 A1* | 8/2004 | Charney et al. | 704/270.1 |
| 2004/0236574 A1 | 11/2004 | Ativanichayaphong et al. | |
| 2005/0010865 A1* | 1/2005 | Kuppusamy et al. | 715/512 |
| 2005/0172232 A1* | 8/2005 | Wiseman | 715/718 |
| 2005/0261908 A1 | 11/2005 | Cross et al. | |
| 2005/0283367 A1 | 12/2005 | Ativanichayaphong et al. | |
| 2006/0122836 A1 | 6/2006 | Cross et al. | |
| 2006/0136222 A1 | 6/2006 | Cross et al. | |
| 2006/0190264 A1 | 8/2006 | Jaramillo et al. | |
| 2006/0229880 A1 | 10/2006 | White et al. | |
| 2006/0235694 A1 | 10/2006 | Cross et al. | |
| 2007/0250841 A1* | 10/2007 | Scahill et al. | 719/320 |
| 2008/0065389 A1* | 3/2008 | Cross et al. | 704/270 |
| 2008/0154604 A1* | 6/2008 | Sathish et al. | 704/257 |
| 2008/0208591 A1* | 8/2008 | Ativanichayaphong et al. | 704/275 |

* cited by examiner

ENABLING SPEECH RECOGNITION GRAMMARS IN WEB PAGE FRAMES

CROSS REFERENCE TO RELATED APPLICATION

This application is a continuation of U.S. patent application Ser. No. 11/567,235, filed on Dec. 6, 2006, now U.S. Pat. No. 7,827,033, issued on Nov. 2, 2010, entitled "Enabling Grammars In Web Page Frame," the entirety of which is incorporated herein by reference.

BACKGROUND OF THE INVENTION

1. Field of the Invention

The field of the invention is data processing, or, more specifically, methods, apparatus, and products for enabling grammars in web page frames.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML.

Current lightweight voice solutions require a developer to build a grammar and lexicon to limit the potential number of words that an automatic speech recognition ('ASR') engine must recognize—as a means for increasing accuracy. Pervasive devices typically have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a decent level of confidence, recognize the name of the city spoken.

Voice interaction features are integrated with X+V and can consequently be used directly within X+V content. X+V includes voice modules that support speech synthesis, speech dialogs, command and control, and speech grammars. Voice handlers can be attached to X+V elements and respond to specific events. For synchronizing the VoiceXML elements with corresponding visual interface elements, X+V uses XML Events events (referred to in this document generally as 'events'). The specifications for X+V may be had from the VoiceXML Forum Forum. The specifications for both XHTML and XML Events may be had from the HTML Home Page of the World Wide Consortium. The specifications for VoiceXML may be had from the Voice Browser Activity of the World Wide Consortium.

A multimodal application may span multiple XHTML web pages. One of these web pages may specify multiple frames where each frame contains its own XHTML page. For an overview of HTML frames, see the website of the World Wide Web Consortium. Frames allow an author to present multiple views or subwindows that a browser displays simultaneously. One common use is to separate the navigation of the application as a separate subwindow. The navigation subwindow does not change as content is updated in another subwindow. To specify multiple frames, there is a top-level XHTML document, known as a 'frameset document,' among the documents that comprise the application that contains a <frameset> markup element. One or more <frame> elements are disposed as markup in the frameset document as children of <frameset>. Each frame has a name so that multiple XHTML documents can be placed within it as new content. Each frame can be targeted by its name in markup that identifies a document to display in a subwindow defined by a frame. <link> and <anchor> elements within the XHTML document specify which frame will load the referenced XHTML document via a 'target' markup attribute. By default the current frame is the target if the 'target' attribute is missing. If a user activates a hyperlink in a frame by use of a mouseclick through a graphical user interface ('GUI'), only the target frame is updated with new content.

In current art, however, only the frame currently in focus will have speech recognition grammars enabled. Because the user can see all frames displayed by the browser at one time, the user expects the grammars for all the frames to be enabled. The frames are enabled for hyperlinking through the GUI, but not by voice.

In addition, there is no targeting of a frame when voice is used to activate a hyperlink. The grammar that when matched against a user utterance activates a voice-enabled hyperlink may be derived from the link's attributes, from a title attribute, a name attribute, from another attribute, or from text between a start tag and an end tag in markup of a link. But when the user says the hyperlink's title and the link is activated, the whole page, not a target frame, will be updated with new content. All of the application's frames, including its navigation frame, will be replaced by a single new page. The frame structure defined in the frameset document is destroyed, and the application becomes a single frame application.

SUMMARY OF THE INVENTION

This invention seeks to overcome the limitations of the current state of the art in enabling grammars in web page frames in multimodal browsers with methods, systems, and products that voice enable hyperlinks in all displayed frames at one time and set a target of the each hyperlink so that updated content appears in the appropriate frame. Methods, apparatus, and computer program products are described for enabling grammars in web page frames that include receiving, in a multimodal application on a multimodal device, a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
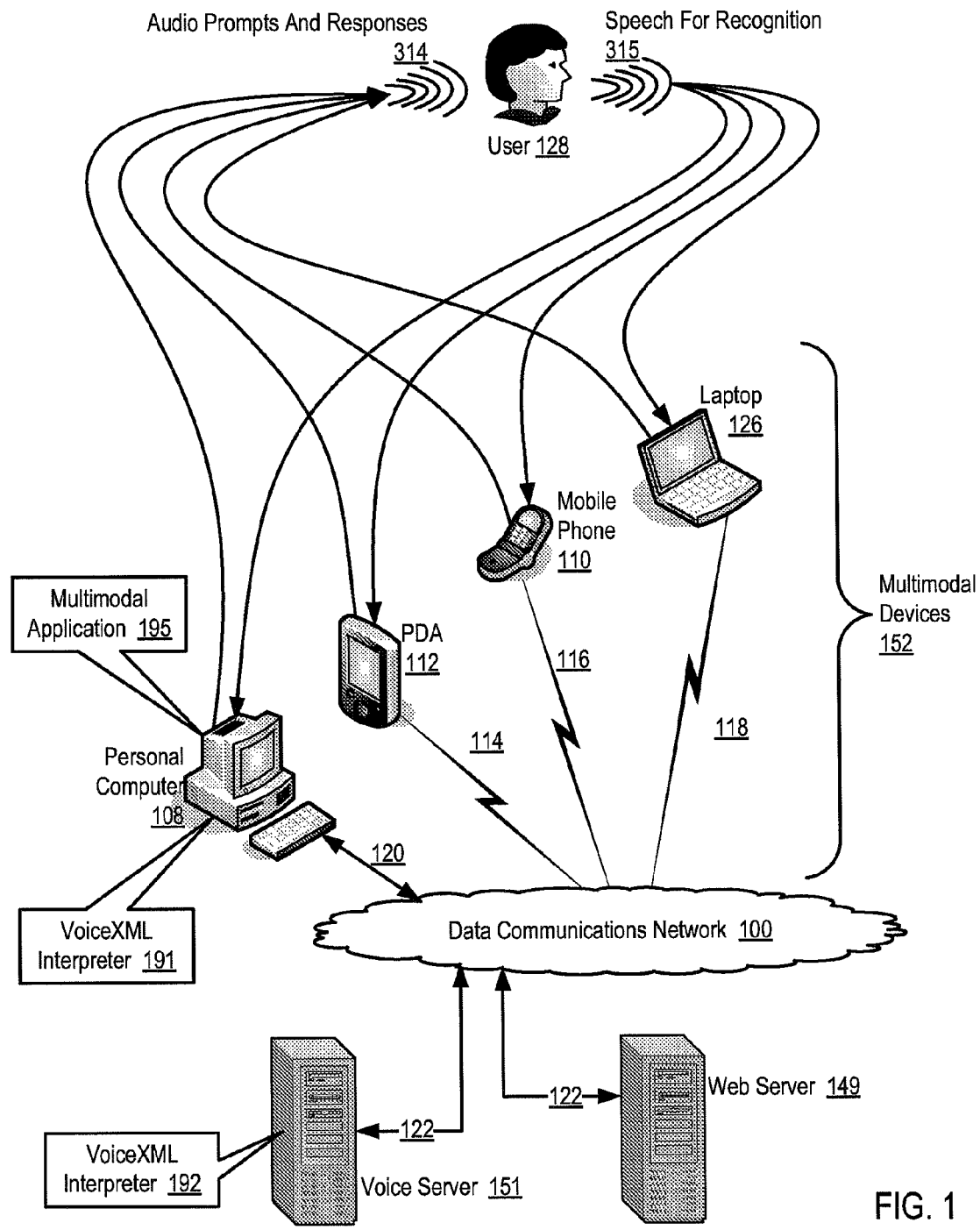
FIG. 1 sets forth a network diagram illustrating an exemplary system for enabling grammars in web page frames according to embodiments of the present invention.

Exemplary methods, apparatus, and products for enabling grammars in web page frames according to embodiments of the present invention are described with reference to the accompanying drawings, beginning with FIG. 1. FIG. 1 sets forth a network diagram illustrating an exemplary system for enabling grammars in web page frames according to embodiments of the present invention. The system of FIG. 1 operates generally to enable grammars in web page frames according to embodiments of the present invention by receiving, in a multimodal application (195) on a multimodal device (152), a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition. Operation of the system of FIG. 1 typically also include providing, by the multimodal application to an automated voice markup language interpreter, speech for recognition from a user; matching, by the automated voice markup language interpreter with an enabled grammar, at least part of the speech for recognition; and returning, from the automated voice markup language interpreter to the multimodal application, an event indicating an instruction representative of the matched speech.

A multimodal application (195) is a module of computer program instructions capable of operating a multimodal device as an apparatus that supports enabling grammars in web page frames according to embodiments of the present invention. A multimodal device (152) is an automated device, that is, automated computing machinery or a computer program running on an automated device that is capable of accepting speech input from a user, digitizing speech, and providing digitized speech along with voice recognition grammars to an automated voice markup language interpreter. A multimodal device may be implemented, for example, with a voice-enabled browser on a laptop computer, a voice browser on a telephone handset, an online game implemented with Java on a personal computer, and with other combinations of hardware and software as may occur to those of skill in the art.

The system of FIG. 1 includes several example multimodal devices:

personal computer (108) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech along with voice recognition grammars to an automated voice markup language interpreter. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for enabling grammars in web page frames according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

Each of the example multimodal devices (152) in the system of FIG. 1 may include automated voice markup language interpreter. An automated voice markup language interpreter (191) may be installed locally in the multimodal device itself, or an automated voice markup language interpreter (192) may be installed remotely with respect to the multimodal device, across a data communications network (100) in a voice server (151). When the multimodal device includes an automated voice markup language interpreter, enabling generated grammars may be carried out by providing the grammars to the automated voice markup language interpreter by one or more application programming interface ('API') calls from the multimodal application to the automated voice markup language interpreter. When the automated voice markup language interpreter is located on a voice server, the multimodal device may be coupled for data communications to the voice server, enabling generated grammars may be carried out by providing the grammars to the automated voice markup language interpreter by one or more data communications protocol messages from the multimedia device to the automated voice markup language interpreter on the voice server.

Each of the example multimodal devices (152) in the system of FIG. 1 is configured and programmed to be capable of enabling grammars in web page frames according to embodiments of the present invention by receiving, in a multimodal application (195) on a multimodal device (152), a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition.

The description of these four example multimodal devices (152) is for explanation only, not for limitation of the invention. Any automated computing machinery capable of accepting speech from a user, providing the speech digitized to an automated voice markup language interpreter, and receiving and playing speech prompts and responses may be improved to function as a multimodal device for enabling grammars in web page frames according to embodiments of the present invention.

The system of FIG. 1 also includes a voice server (151) which is connected to data communications network (100) through wireline connection (122). The voice server (151) is a computer that runs an automated voice markup language interpreter, such as, for example, a VoiceXML interpreter, that provides voice recognition services for multimodal devices by accepting requests for speech recognition with voice recognition grammars and returning responses that may include text representing recognized speech or events for processing by a multimodal client application. Voice server (151) also provides text to speech ('TTS') conversion for voice prompts and voice responses (314) to user input in multimodal client applications such as, for example, X+V applications or Java voice applications.

The system of FIG. 1 includes a data communications network (100) that connects the multimodal devices (152) and the voice server (151) for data communications. A data communications network for enabling grammars in web page frames according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
a data communications network layer with the Internet Protocol ('IP'),
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The arrangement of the voice server (151), the multimodal devices (152), and the data communications network (100) making up the exemplary system illustrated in FIG. 1 are for explanation, not for limitation. Data processing systems useful for enabling grammars in web page frames according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

The term 'markup' is used in this paper to refer to markup elements and markup attributes in markup languages, HTML, XHTML, XML, X+V, VoiceXML, and so on. A web page frame is markup, an XHTML <frame> element, for example, that defines multiple views, windows or subwindows, for display of content. The term 'frame' is used to refer both to the markup that defines the views as well as to refer to the views themselves. Multiple views offer designers a way to keep certain information visible, while other views are scrolled or replaced. For example, within the same window, one frame might display a static banner, a second a navigation menu, and a third the main document that can be scrolled through or replaced by navigating in the second frame.

A frameset document is a markup document, such as, for example, an X+V document, that describes frame layout. A frameset document has a different makeup than an HTML document without frames. A standard HTML, XHTML, or X+V document has one <head> section and one <body>. A frameset document has a <head> and a <frameset> in place of the <body>. The <frameset> section of a markup document specifies the layout of views on a computer display screen. The content to be displayed in a frame is not included in the same document where the frame is defined, in the frameset document. The contents are in another document, a 'content document,' which is typically remotely stored on a web server, often not on the same web server that served the frameset document to a multimodal device. The locations of the content documents are specified in frame markup, a 'src' attribute. Each content document is typically in effect a web page itself, an HTML, XHTML, XML, or X+V document, also typically containing navigable markup elements, such as link <link> elements and anchor <a> elements.

A grammar is markup that communicates to an automated voice markup language interpreter the words and sequences of words that may be recognized. Grammars for use in enabling grammars in web page frames according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from within a dialog with a URI. Here is an example of a grammar expressed in JSFG:

```
<grammar scope="dialog" ><![CDATA[
#JSGF V1.0;
grammar command;
<command> = [remind me to] call | phone | telephone <name>
<when>;
<name> = bob | martha | joe | pete | chris | john | artoush;
<when> = today | this afternoon | tomorrow | next week;
]]>
</grammar>
```

In this example, the markup elements <command>, <name>, and <when> are rules of the grammar. Rules are a combination of a rulename and an expansion of a rule that advises an automated voice markup language interpreter which words presently can be recognized. In this example, expansion includes conjunction and disjunction, and the vertical bars '|' mean 'or.' An automated voice markup language interpreter processes the rules in sequence, first <command>, then <name>, then <when>. The <command> rule matches 'call' or 'phone' or 'telephone' plus, that is, in conjunction with, whatever is returned from the <name> rule and the <when> rule. The <name> rule matches 'bob' or 'martha' or 'joe' or 'pete' or 'chris' or 'john' or 'artoush', and the <when> rule matches 'today' or 'this afternoon' or 'tomorrow' or 'next week.' The command grammar as a whole matches utterances like these, for example:

'phone bob next week,'
'telephone martha this afternoon,'
'remind me to call chris tomorrow,' and
'remind me to phone pete today.'

The system of FIG. 1 includes a web server (149) that uses request/response protocols such as HTTP to provide web pages, regular web pages as well as frameset documents, to multimodal devices (152). Receiving, in a multimodal application (195) on a multimodal device (152), a frameset document, where the frameset document includes markup defining web page frames may be carried out by receiving in an HTTP message a frameset document such as this example frameset document:

```
<!DOCTYPE HTML PUBLIC "-//W3C//DTD HTML 4.01 Frameset//EN"
"http://www.w3.org/TR/html4/frameset.dtd">
<HTML>
<HEAD>
<TITLE>A frameset document</TITLE>
</HEAD>
<FRAMESET id="frameset1" cols="33%,33%,33%">
<FRAMESET id="frameset2" rows="*,200">
<FRAME id="frame1" src="contents_of_frame1.html">
<FRAME id="frame2" src="contents_of_frame2.gif">
</FRAMESET>
<FRAME id="frame3" src="contents_of_frame3.html">
<FRAME id="frame4" src="contents_of_frame4.html">
</FRAMESET>
```

This frameset document defines four frames organized in a hierarchy by framesets, 'frameset1' and 'frameset2.' Frameset2 is nested in frameset1, creating a hierarchy of frames with frame3 and frame4 in a top layer and frame1 and frame2 in a lower layer. The content documents to be displayed in each frame are identified in the src attributes as three HTML documents named 'contents_of_frame1.html,' 'contents_of_frame3.html,' and 'contents_of_frame4.html,' and one image, a Graphic Interchange Format ('GIF') document named 'contents_of_frame2.gif.' Each src value, that is, each content documents name, is actually a relative Uniform Resource Locators ('URL') that, in addition to providing a name of a content document, also specifies the content document's location in cyberspace, in this example, in relation to a base location taken as //www.w3.org/TR/html4/.

Each of the HTML content documents in this example may contain navigable markup element, link elements and anchor elements. The GIF document may not contain navigable elements. Obtaining by the multimodal application content documents for display in each of the web page frames here, frames 1 through 4, can be carried out by retrieving through HTTP from //www.w3.org/TR/html4/the identified content documents. In the ordinary course, the multimodal application would then display each content document is its designated frame, which is referred to as the content document's 'target frame.'

The multimodal applications generate, for each navigable markup element in each content document, a segment of markup defining a speech recognition grammar, including inserting in each such grammar markup identifying content to be displayed when words in the grammar are matched and markup identifying a frame where the content is to be displayed. Inserting in each such grammar markup identifying content to be displayed when words in the grammar are matched may be carried out by scanning through each document for navigable markup elements, link elements and anchor elements, each of which has an 'href' attribute specifying a URL that provides a location for a further content document, and writing the 'href' values, the URLs, into the grammar. A word in a grammar is 'matched' when an automated voice markup language interpreter matches the word with speech for recognition from a user. Inserting in each such grammar markup identifying a frame where the content is to be displayed may be carried out by inserting in the grammar the frame identification, the 'id' attribute value, of the target frame of the content document. In this way, the following example anchor element from a content document:

<a href="pizza/pizza.html" target="contentFrame"> Pizza Demo</a> generates the following grammar for voice-activating the hyperlink represented by the anchor element:

$grammar=Pizza Demo{$.link="pizza/pizza.html"; $.target="contentFrame"} to embodiments of the present invention creates grammars for each navigable element in each content document referenced by frames in the frameset document. The multimodal applications may then enable all the generated grammars for speech recognition by dynamically generating a markup language fragment specifying a grammar and providing the markup language fragment to an automated voice markup language interpreter. Dynamically generating a markup language fragment specifying a grammar means placing each generated grammar in a segment of markup that returns an event to the multimodal application when a word in such a grammar is matched by an automated voice markup language interpreter.

In this way, a multimodal application can use an application programming interface ('API') call or a message in a data communication protocol to provide to an automated voice markup language interpreter a segment of markup, such as for example, a segment of VoiceXML, containing a <link> element. When the link grammar is matched, the interpretation result is raised as an event back to the application program. Here is an example of a VoiceXML link element that includes a generated grammar and an event:

```
<vxml:link eventexpr="application.lastresult$.interpretation.c3n">
<vxml:grammar> <![CDATA[
#JSGF V1.0;
$grammar = Pizza Demo { $.link ="pizza/pizza.html";
$.target ="contentFrame" }
]]>
</vxml:grammar>
<catch event="command link">
<value
expr="window.c3nEvent(application.lastresult$.interpretati on.c3n)"/>
</catch>
</vxml:link>
```

A semantic interpretation function of a VoiceXML interpreter builds up an event string when it matches a user's utterance. An event is the representation of some asynchronous occurrence, such as a mouse click on the presentation of an element, a match on a word in a grammar of an element, an arithmetical error in the value of an attribute of the element, or any of many other possibilities, that gets associated with an element (targeted at it) in an content document. The general behavior of a multimodal application is that when an event occurs it is dispatched by passing it down a DOM document tree to the element where the event occurred (called its target). An action is some way of responding to an event; a handler is some specification for such an action, for instance using scripting or some other method. A listener is a binding of such a handler to an event targeting some element in a document. In this example, the event is a voice activation of a hyperlink represented by an anchor element, the handler is the <catch> element, and the listener is a dialog specified by a <form> element in the multimodal application.

Including the event string in the "eventexpr" attribute of the <vxml:link> in the Pizza Demo example causes the semantic interpretation function to raise the event string as an event that invokes the hyperlink represented by the Pizza Demo anchor element. The <vxml:link> also contains a <catch> element that processes the events generated by the semantic interpretation function. Within the catch element, a Document Object Model ('DOM') function "window.c3nEvent( )" is executed, passing in the event string.

The multimodal application generates the markup for the <vxml:link> element from the navigable markup elements in a content document referenced by a target frame. The multimodal application adds the <vxml:link> and the <catch> to the markup segment with the grammar and provides the entire markup segment to a VoiceXML interpreter. Now if a user utters "Pizza Demo" the event expression attribute of the <vxml:link>, which contains "application.lastresult$.interpretation.c3n" resolves to the string "link.pizza/pizza.html.contentFrame". The event is thrown by the <vxml:link> and caught by the <catch> handler in the <vxml:link>. A DOM API called in the catch handler interprets the event string according to the event hierarchy established by the grammar contained in the <vxml:link> element. Strings that start with "command." may be interpreted as menu commands while strings that start with "link." may be interpreted as content navigation. This Pizza Demo is an example of content navigation.

Enabling grammars in web page frames according to embodiments of the present invention is generally implemented with one or more multimodal devices, that is, automated computing machinery or computers. In the system of FIG. 1, for example, all the multimodal devices are implemented to some extent at least as computers. For further explanation, therefore, FIG. 2 sets forth a block diagram of automated computing machinery comprising an example of a computer useful as a multimodal device (152) in enabling grammars in web page frames according to embodiments of the present invention. The multimodal device (152) of FIG. 2 includes at least one computer processor (156) or 'CPU' as well as random access memory (168) ('RAM') which is connected through a high speed memory bus (166) and bus adapter (158) to processor (156) and to other components of the multimodal device.

Stored in RAM (168) is a multimodal application (195), a module of computer program instructions capable of operating a multimodal device as an apparatus that supports enabling grammars in web page frames according to embodiments of the present invention. Multimodal application (195) in this example is programmed to enable grammars in web page frames according to embodiments of the present invention by receiving, on a multimodal device, a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition. Multimodal application (195) in this example is programmed to provide, to an automated voice markup language interpreter, speech for recognition from a user. In this example, an automated voice markup language interpreter is represented as a VoiceXML interpreter (192). When a word or words in the user speech is matched by the automated voice markup language interpreter with an enabled grammar, the multimodal application accepts from the interpreter and processes an event indicating an instruction representative of the matched speech. The automated voice markup language interpreter (192) includes a grammar (104) that in turn as described above includes rules defining which words and sequences of words are presently enabled for recognition.

Multimodal application (195) typically is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to an automated voice markup language interpreter (192), represented here as a VoiceXML interpreter. The multimodal application may be a Java voice application that itself process grammars and provides grammars and digitized speech for recognition directly through an API to an ASR engine (150). Or the multimodal application may be an X+V application running in a browser or microbrowser that passes VoiceXML grammars through API calls directly to an embedded VoiceXML interpreter (192) for processing. The embedded VoiceXML interpreter (192) may in turn issue requests for speech recognition through API calls directly to an embedded ASR engine (150). Multimodal application (195) also provides TTS conversion by API calls to an embedded TTS engine (194) for voice prompts and voice responses to user input in multimodal applications such as, for example, X+V applications or Java voice applications. The multimodal application (195) in this example does not send speech for recognition across a network to a voice server for recognition, and the multimodal application (195) in this example does not receive TTS prompts and responses across a network from a voice server. All grammar processing, voice recognition, and text to speech conversion in this example is performed in an embedded fashion in the multimodal device itself.

ASR engine (150), also stored in RAM in this example, is a module of computer program instructions for carrying out automated speech recognition. An example of an embedded ASR engine that may be improved for enabling grammars in web page frames according to embodiments of the present invention is IBM's Embedded ViaVoice Enterprise, an ASR product that also includes an embedded TTS engine. The ASR engine (150) includes an ASR lexicon (106) of words capable of recognition by the ASR engine. Also stored in RAM (168) is an embedded TTS Engine (194), a module of computer program instructions that accepts text as input and returns the same text in the form of digitally encoded speech, for use in providing speech as prompts for and responses to users of multimodal systems.

Figure 3:
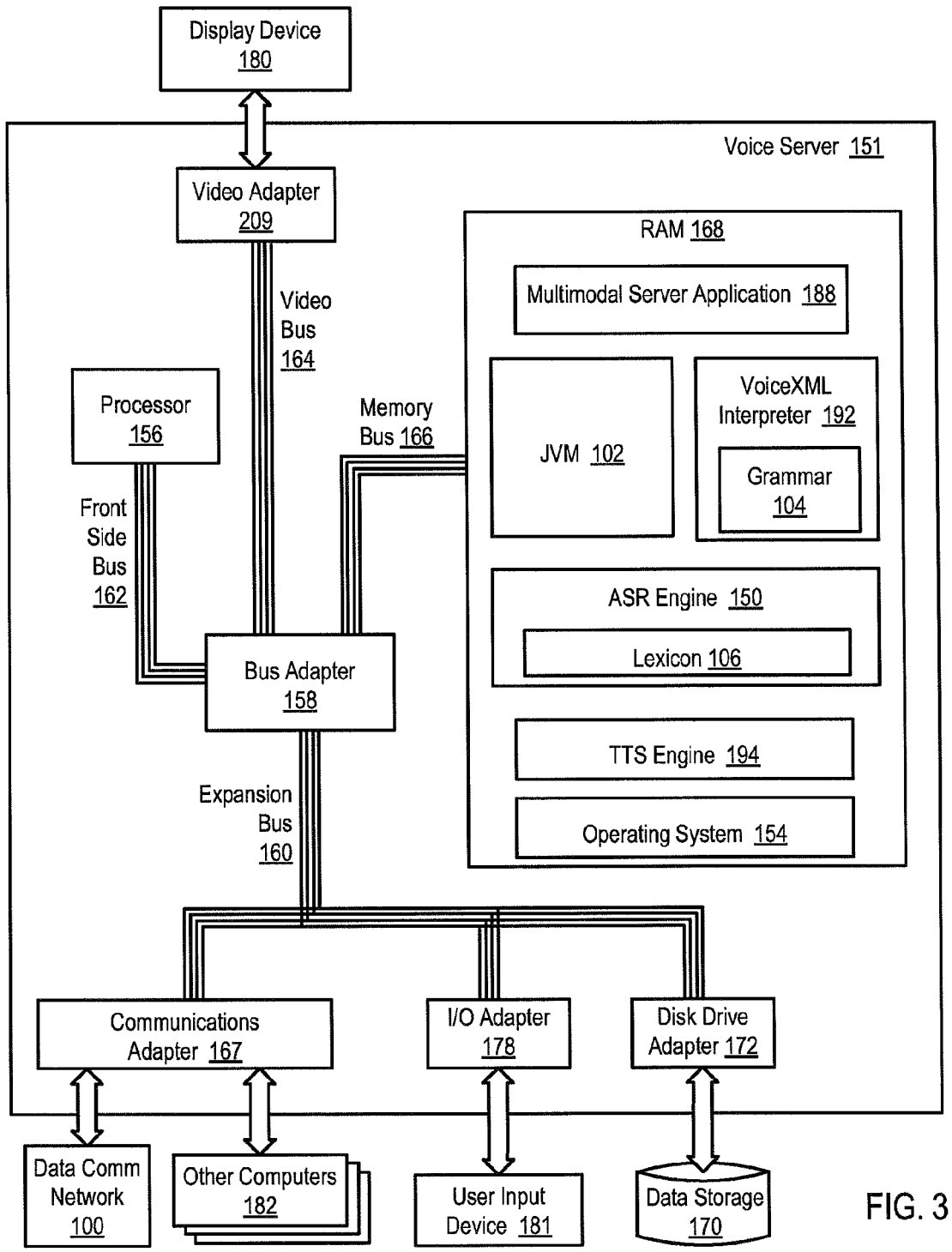
FIG. 3 sets forth a block diagram of automated computing machinery comprising an example of a computer useful as a voice server in enabling grammars in web page frames according to embodiments of the present invention.

Also stored in RAM (168) is an operating system (154). Operating systems useful in voice servers according to embodiments of the present invention include UNIX™, Linux™ Microsoft NT™, AIX™, IBM's i5/OS™, and others as will occur to those of skill in the art. Operating system (154), multimodal application (195), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Figure 2:
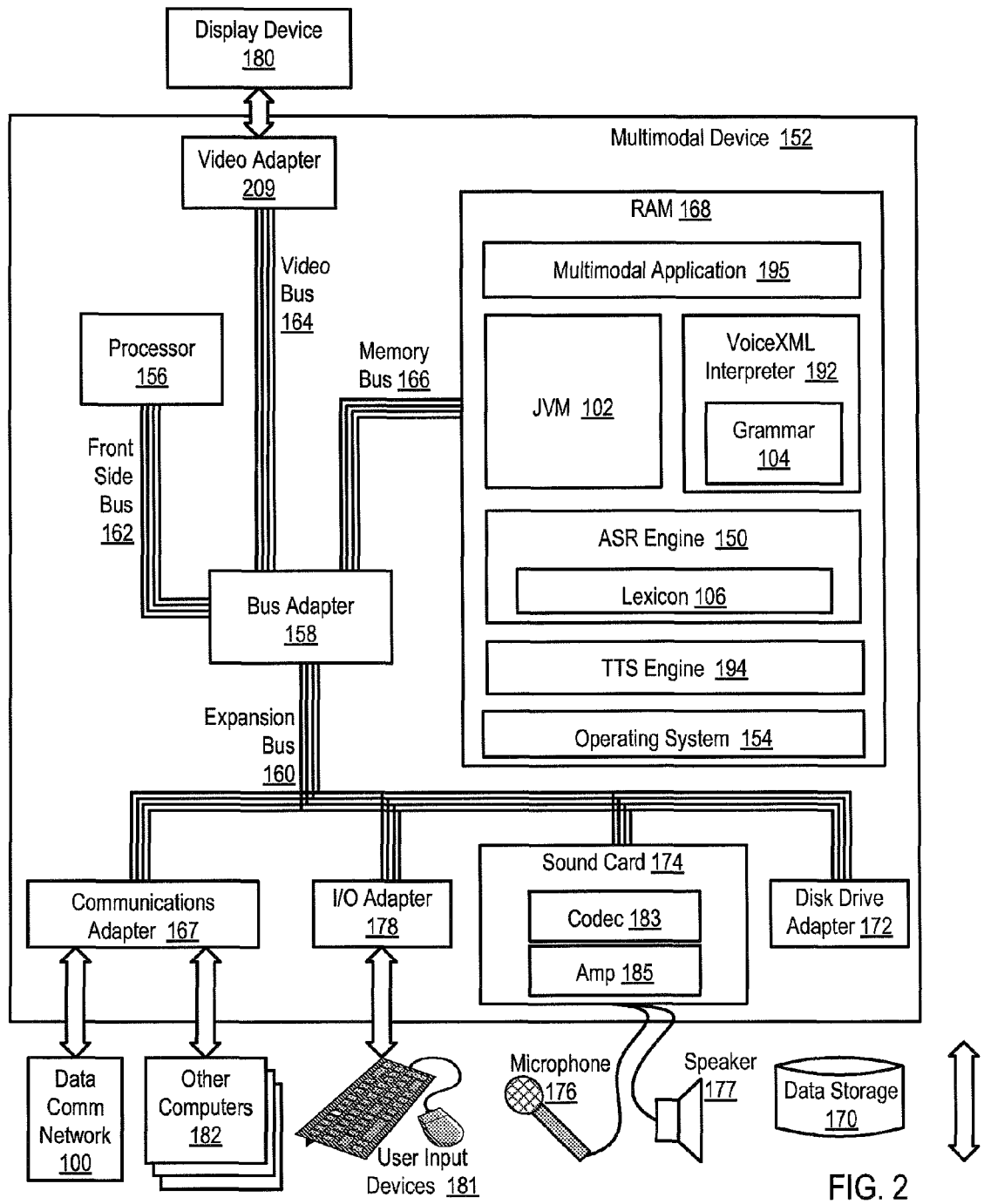
FIG. 2 sets forth a block diagram of automated computing machinery comprising an example of a computer useful as a multimodal device in enabling grammars in web page frames according to embodiments of the present invention.

The multimodal device (152) of FIG. 2 includes a bus adapter (158), a computer hardware component that contains drive electronics for the high speed buses, the front side bus (162), the video bus (164), and the memory bus (166), as well as for the slower expansion bus (160). Examples of bus adapters useful in multimodal devices according to embodiments of the present invention include the Intel Northbridge, the Intel Memory Controller Hub, the Intel Southbridge, and the Intel I/O Controller Hub. Examples of expansion buses useful in multimodal devices according to embodiments of the present invention include Industry Standard Architecture ('ISA') buses and Peripheral Component Interconnect (PCP) buses.

Multimodal device (152) of FIG. 2 includes disk drive adapter (172) coupled through expansion bus (160) and bus adapter (158) to processor (156) and other components of the multimodal device (152). Disk drive adapter (172) connects non-volatile data storage to the multimodal device (152) in the form of disk drive (170). Disk drive adapters useful in multimodal devices include Integrated Drive Electronics ('IDE') adapters, Small Computer System Interface ('SCSI') adapters, and others as will occur to those of skill in the art. In addition, non-volatile computer memory may be implemented for a multimodal device as an optical disk drive, electrically erasable programmable read-only memory space (so-called 'EEPROM' or 'Flash' memory), RAM drives, and so on, as will occur to those of skill in the art.

The example multimodal device of FIG. 2 includes one or more input/output ('I/O') adapters (178). I/O adapters in multimodal devices implement user-oriented input/output through, for example, software drivers and computer hardware for controlling output to display devices such as computer display screens, as well as user input from user input devices (181) such as keyboards and mice. The example multimodal device of FIG. 2 includes video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example multimodal device of FIG. 2 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

The exemplary multimodal device (152) of FIG. 2 includes a communications adapter (167) for data communications with other computers (182) and for data communications with data communications network (100). Such data communications may be carried out through serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for enabling grammars in web page frames according to embodiments of the present invention include modems for wired dial-up communications, Ethernet (IEEE 802.3) adapters for wired data communications network communications, and 802.11b adapters for wireless data communications network communications.

Enabling grammars in web page frames according to embodiments of the present invention in some embodiments may be implemented with one or more voice servers, computers, that is, automated computing machinery, that provide speech recognition. For further explanation, therefore, FIG. 3 sets forth a block diagram of automated computing machinery comprising an example of a computer useful as a voice server (151) in enabling grammars in web page frames according to embodiments of the present invention. The voice server (151) of FIG. 3 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a multimodal server application (188), a module of computer program instructions capable of operating a voice server in a system that is configured to carry out data communications required to receive grammars and digitized speech for recognition from a multimodal client device, pass the grammars and digitized speech to an automated voice markup language interpreter for processing, and return responses from the automated voice markup language interpreter to the multimodal device. Such responses may include text representing recognized speech, text for use as variable values in dialogs, and events, that is, event text as string representations of scripts from semantic interpretation. Multimodal server application (188) also includes computer program instructions that provide text-to-speech ('TTS') conversion for voice prompts and voice responses to user input in multimodal applications such as, for example, X+V applications or Java Speech applications.

Multimodal server application (188) may be implemented as a web server, implemented in Java, C++, or another language, that supports X+V by providing responses to HTTP requests from X+V clients. Multimodal server application (188) may, for a further example, be implemented as a Java server that runs on a Java Virtual Machine (102) and supports a Java voice framework by providing responses to HTTP requests from Java client applications running on multimodal devices. And multimodal server applications that support enabling grammars in web page frames may be implemented in other ways as may occur to those of skill in the art, and all such ways are well within the scope of the present invention.

Also disposed in RAM in the example of FIG. 3 is an ASR engine (150). ASR engine (150) is a module of computer program instructions that carry out speech recognition by use of an ASR lexicon (106) of words capable of recognition by the ASR engine. The lexicon (106) is an association of words in text form with phonemes representing pronunciations of each word. In carrying out automated speech recognition, the ASR engine receives speech for recognition from an automated voice markup language interpreter in the form of at least one digitized word, uses frequency components of the digitized word to derive a Speech Feature Vector ('SFV'), uses the SFV to infer phonemes for the word from a language-specific acoustic model (not shown). A language-specific acoustic model is a data structure, a table or database, for example, that associates SFVs with phonemes representing, to the extent that it is practically feasible to do so, all pronunciations of all the words in a particular language. The ASR engine then uses the phonemes to find the word in the lexicon. If the word is found, the text version of the word is returned to the automated voice markup language interpreter as recognized speech. The automated voice markup language interpreter may then determine whether the recognized speech matches a word in an enabled grammar.

Also stored in RAM is an automated voice markup language interpreter, represented here, for example, as a VoiceXML interpreter (192), a module of computer program instructions that processes VoiceXML grammars. VoiceXML input to VoiceXML interpreter (192) may originate from VoiceXML clients running remotely on multimodal devices, from X+V multimodal client applications running remotely on multimodal devices, or from Java client applications running remotely on multimedia devices. In this example, VoiceXML interpreter (192) interprets and executes VoiceXML segments received from remote multimedia clients and provided to VoiceXML interpreter (192) through multimodal server application (188). The VoiceXML interpreter (192) includes a grammar (104) that in turn as described above includes rules defining which words and sequences of words are presently enabled for recognition. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

Also stored in RAM (168) is an operating system (154). Operating systems useful in voice servers according to embodiments of the present invention include UNIX™, Linux™ Microsoft NTT™, AIX™, IBM's i5/OS™, and others as will occur to those of skill in the art. Operating system (154), multimodal server application (188), VoiceXML interpreter (192), ASR engine (150), JVM (102), and TTS Engine (194) in the example of FIG. 3 are shown in RAM (168), but many components of such software typically are stored in non-volatile memory also, for example, on a disk drive (170).

Voice server (151) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect (PCP) buses.

Voice server (151) of FIG. 3 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 3 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 3 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for enabling grammars in web page frames according to embodiments of the present invention include modems for wired dial-up communications, Ethernet (IEEE 802.3) adapters for wired data communications network communications, and 802.11 adapters for wireless data communications network communications.

Figure 4:
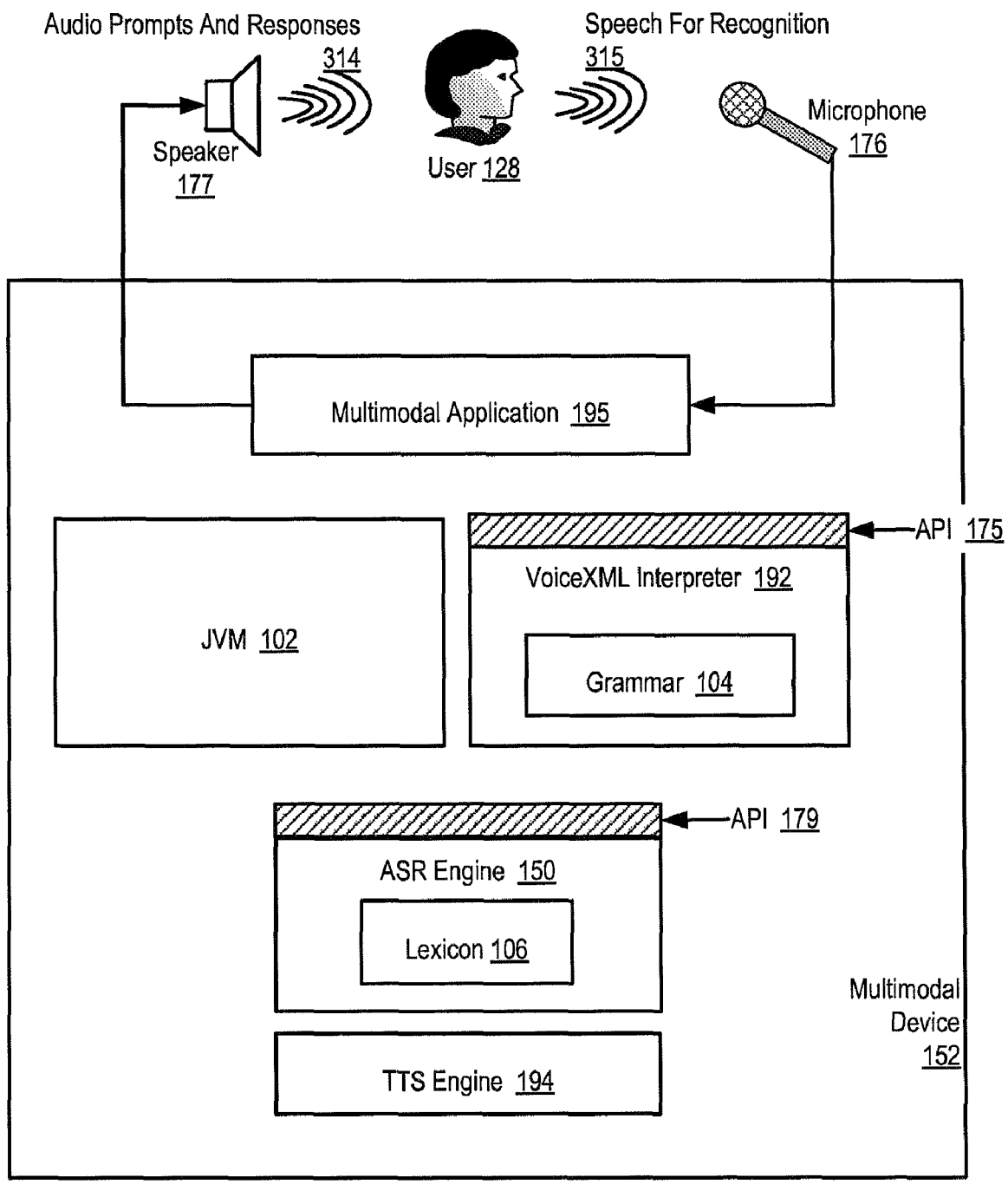
FIG. 4 sets forth a functional block diagram of exemplary apparatus for enabling grammars in web page frames according to embodiments of the present invention.

For further explanation, FIG. 4 sets forth a functional block diagram of exemplary apparatus for enabling grammars in web page frames according to embodiments of the present invention. In the example of FIG. 4, there is only a multimodal device (152) and a user (128), no network, no VoIP connection, and no voice server containing a remote ASR engine. All the components needed for enabling grammars in web page frames according to embodiments of the present invention are installed or embedded in the multimodal device itself, a laptop, a PDA, a cell phone, or the like.

The apparatus of FIG. 4 operates in a manner similar to the system of FIG. 2. Multimodal application (195) is a module of computer program instructions capable of operating a multimodal device as an apparatus that enables grammars in web page frames according to embodiments of the present invention. In this example, multimodal application (195) in this example is also configured to enable grammars in web page frames according to embodiments of the present invention by receiving, on a multimodal device, a frameset document, where the frameset document includes markup defining web page frames; obtaining by the multimodal application content documents for display in each of the web page frames, where the content documents include navigable markup elements; generating by the multimodal application, for each navigable markup element in each content document, a segment of markup defining a speech recognition grammar, including inserting in each such grammar markup identifying content to be displayed when words in the grammar are matched and markup identifying a frame where the content is to be displayed; and enabling by the multimodal application all the generated grammars for speech recognition. Multimodal application (195) in this example is programmed to provide, to an automated voice markup language interpreter, speech for recognition from a user. In this example, an automated voice markup language interpreter is represented as a VoiceXML interpreter (192). The multimodal application (195) accepts speech for recognition from a user and sends the speech for recognition through API (175) to the VoiceXML interpreter (192). When a word or words in the user speech is matched by the automated voice markup language interpreter with an enabled grammar, the multimodal application accepts from the interpreter and processes an event indicating an instruction representative of the matched speech. The VoiceXML interpreter (192) includes a grammar (104) that in turn as described above includes rules defining which words and sequences of words are presently enabled for recognition.

Multimodal device application (195) is a user-level, multimodal, client-side computer program that provides a speech interface through which a user may provide oral speech for recognition through microphone (176), have the speech digitized through an audio amplifier and a codec, and provide the digitized speech for recognition to the embedded ASR engine (150). The multimodal device application may be a Java voice application that itself process grammars and provides grammars and digitized speech for recognition directly through API (179) to the embedded ASR engine (150). Or the multimodal device application may be an X+V application running in a browser or microbrowser that passes VoiceXML grammars through API (175) to an embedded VoiceXML interpreter (192) for processing. The embedded VoiceXML interpreter (192) may in turn issue requests for speech recognition through API (179) to the embedded ASR engine (150). Multimodal device application (195) also provides TTS conversion by API calls to an embedded TTS engine (194) for voice prompts and voice responses to user input in multimodal applications such as, for example, X+V applications or Java voice applications. The multimodal device application (195) in this example does not send speech for recognition across a network to a voice server for recognition, and the multimodal device application (195) in this example does not receive TTS prompts and responses across a network from a voice server. All grammar processing, voice recognition, and text to speech conversion is performed in an embedded fashion in the multimodal device itself.

Figure 5:
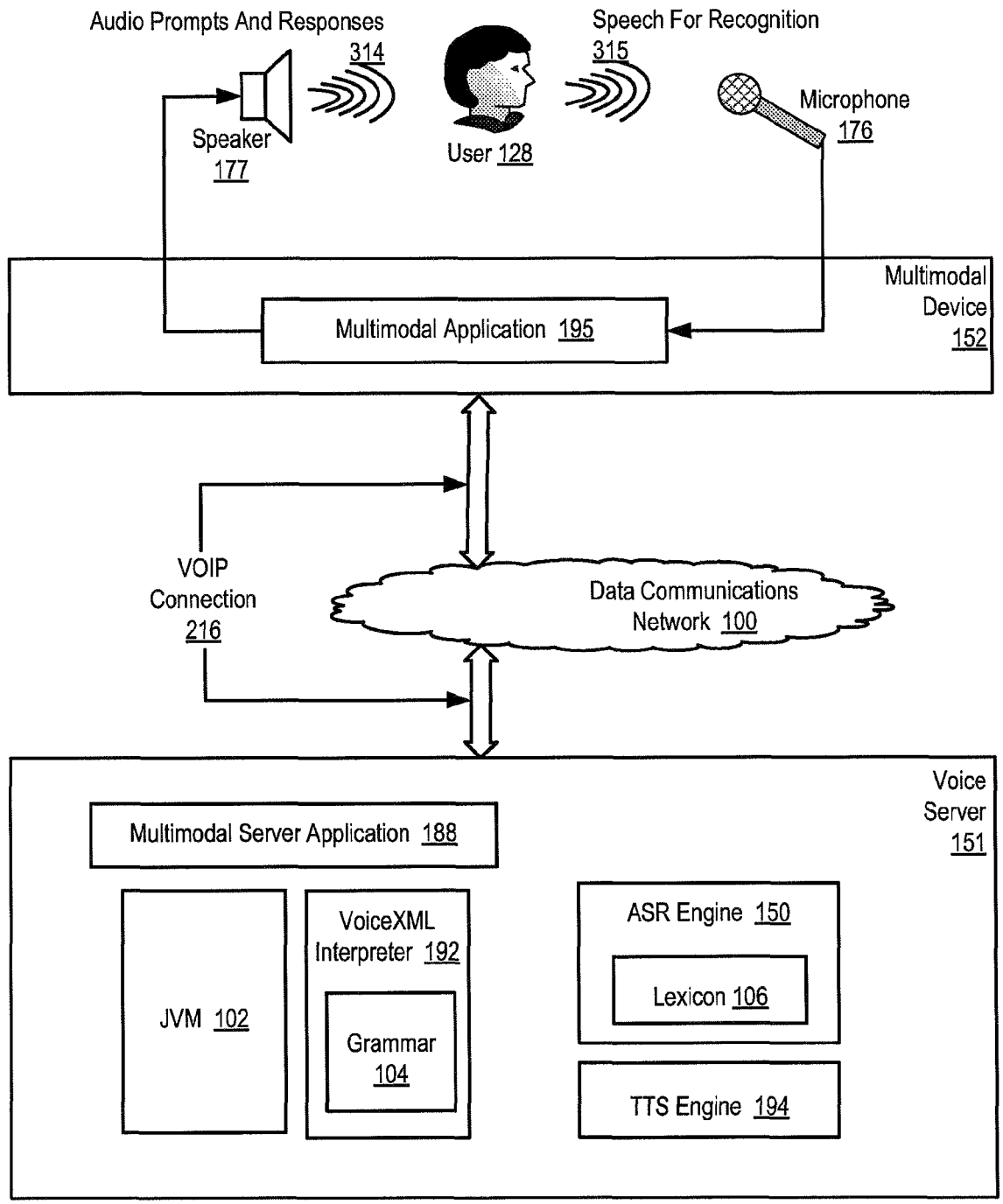
FIG. 5 sets forth a functional block diagram of further exemplary apparatus for enabling grammars in web page frames according to embodiments of the present invention.

For further explanation, FIG. 5 sets forth a functional block diagram of further exemplary apparatus for enabling grammars in web page frames according to embodiments of the present invention. The example of FIG. 5 includes a multimodal device (152) and a voice server (151) connected for data communication by a VoIP connection (216) through a data communications network (100). A multimodal application (195) runs on the multimodal device (152), and a multimodal server application (188) runs on the voice server (151). The voice server (151) also has installed upon it an ASR engine (150) with an ASR lexicon (106), a JVM (102), and a Voice XML interpreter (192) with an enabled grammar (104).

VoIP, standing for 'Voice Over Internet Protocol,' is a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

Many protocols are used to effect VoIP. The two most popular types of VoIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet switching data communications network.

The apparatus of FIG. 5 operates in a manner that is similar to the operation of the system of FIG. 3 described above. Multimodal application (195) presents a voice interface to user (128), sends enabled grammars to the voice server, provides audio prompts and responses (314) and accepts speech for recognition (315) from a user (128). Multimodal application (195) digitizes the speech for recognition according to some codec, packages the speech in a recognition request message according to a VoIP protocol, and transmits the speech to voice server (151) through the VoIP connection (216) on the network (100). Multimodal server application (188) provides voice recognition services for multimodal devices by accepting requests for speech recognition, including enabled grammars and digitized speech, and returning speech recognition results, including text representing recognized speech, text for use as variable values in dialogs, and text as string representations of scripts from semantic interpretation. Multimodal server application (188) includes computer program instructions that provide text-to-speech ('TTS') conversion for voice prompts and voice responses to user input in multimodal applications such as, for example, X+V applications or Java Speech applications.

The multimodal server application (188) receives grammars and digitized speech for recognition from a user and passes the grammars and the speech to the VoiceXML interpreter (192). The VoiceXML interpreter used ASR engine (150) for recognition of individual words and determines whether a word or sequence of words is matched by a grammar. The ASR engine receives from the VoiceXML interpreter digitized speech for recognition, uses frequency components of the digitized speech to derive an SFV, uses the SFV to infer phonemes for the word from a language-specific acoustic model (not shown), and uses the phonemes to find the speech in the lexicon (106).

Figure 6:
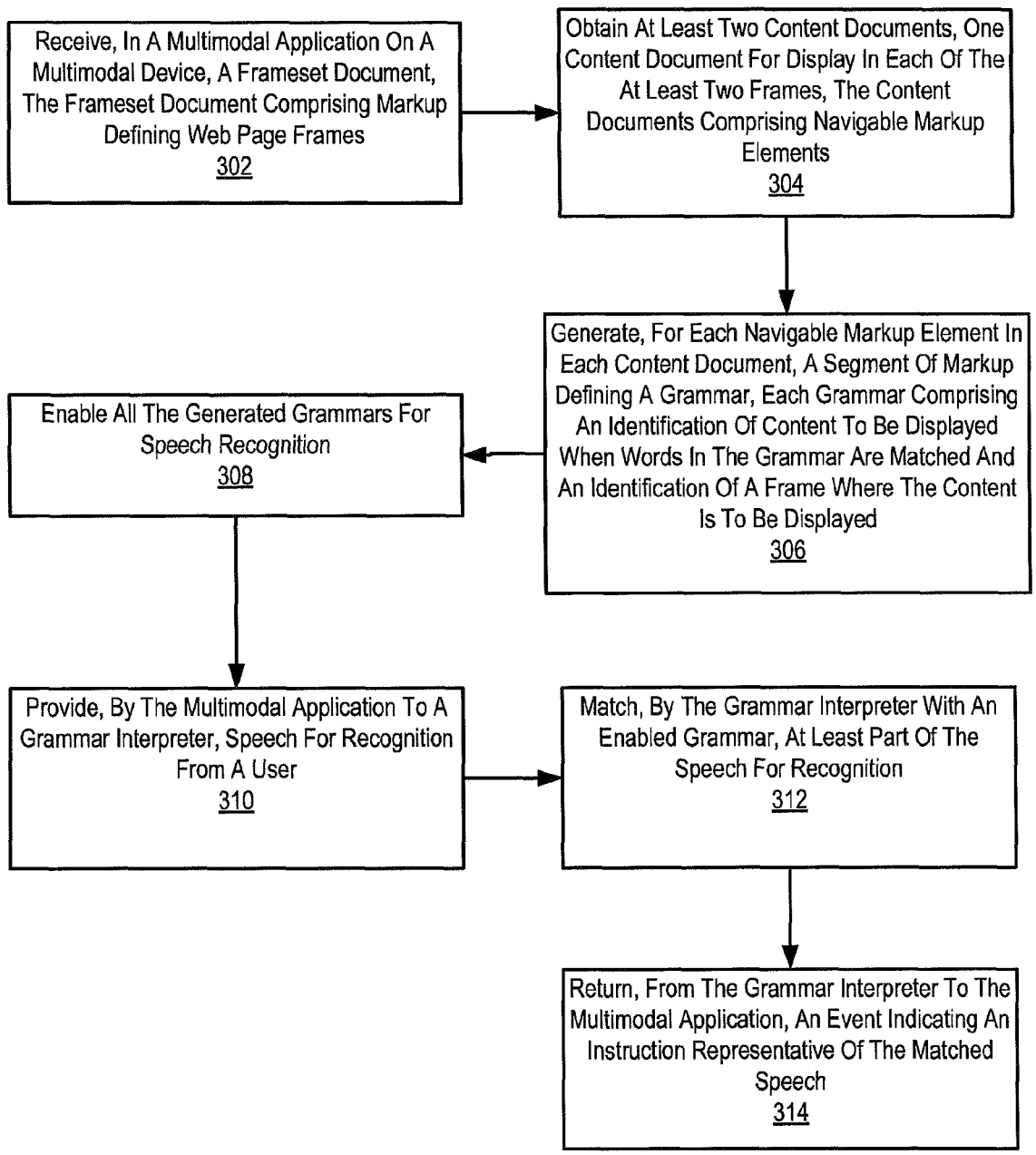
FIG. 6 sets forth a flow chart illustrating an exemplary method of enabling grammars in web page frames according to embodiments of the present invention.

For further explanation, FIG. 6 sets forth a flow chart illustrating an exemplary method of enabling grammars in web page frames according to embodiments of the present invention. The method of FIG. 6 includes receiving (302), in a multimodal application on a multimodal device, a frameset document. Receiving a frameset document typically is carried out by receiving a web page in response to an data communications protocol request message, such as, for example, an HTTP request that return a frameset document. The frameset document includes markup defining web page frames. The following is an example of a frameset document that organizes three frames in a hierarchy according to two framesets:

```
<!DOCTYPE HTML PUBLIC "-//W3C//DTD HTML 4.01 Frameset//EN"
"http://www.w3.org/TR/html4/frameset.dtd">
<HTML>
<HEAD>
<TITLE>A simple frameset document</TITLE>
</HEAD>
<FRAMESET id="frameset1" cols="20%, 80%">
<FRAMESET id="frameset2" rows="100, 200">
<FRAME id="frame1" src="contents_of_frame1.html">
<FRAME id="frame2" src="contents_of_frame2.gif">
</FRAMESET>
<FRAME id="frame3" src="contents_of_frame3.html">
</FRAMESET>
</HTML>
```

The method of FIG. 6 also includes obtaining (304) by the multimodal application content documents for display in each of the web page frames. The content documents typically are web pages that include navigable markup elements such as XHTML link elements and anchor elements. The content documents in this example are the content documents specified by the 'src' URL values in the frame definitions in the frameset document. In this example, the content documents are identified by URLs as contents_of_frame1.html, contents_of_frame2.gif, and contents_of_frame3.html.

In this example, the web page frames are organized in a hierarchy according to two framesets, and the hierarchy is characterized by a topmost frame, frame3, and two child frames, frame1 and frame2. Obtaining at least two content documents in this example therefore may be carried out by iteratively obtaining, for the topmost frame and for each child frame, a separate content document for display in each frame.

The method of FIG. 6 also includes generating (306) by the multimodal application, for each navigable markup element in each content document, a segment of markup defining a speech recognition grammar, including inserting in each such grammar markup identifying content to be displayed when words in the grammar are matched and markup identifying a frame where the content is to be displayed. Markup identifying content to be displayed when words in the grammar are matched may be derived from 'href' attributes in the navigable markup elements in the content documents. Markup identifying a frame where the content is to be displayed may be derived from the 'id' attributes of the target frames for the content in the frameset document.

The method of FIG. 6 also includes enabling (308) by the multimodal application all the generated grammars for speech recognition. Enabling the generated grammars further may be carried out by dynamically generating a markup language fragment specifying a grammar and providing the markup language fragment to an automated voice markup language interpreter. In the method of FIG. 6, the multimodal device may include an automated voice markup language interpreter, and enabling the generated grammars may be carried out by providing the grammars to the automated voice markup language interpreter by one or more application programming interface ('API') calls from the multimodal application to the automated voice markup language interpreter. Alternatively in the method of FIG. 6, the multimodal device may be coupled for data communications to a voice server; the voice server may include an automated voice markup language interpreter; and enabling all the generated grammars may be carried out by providing the grammars to the automated voice markup language interpreter by one or more data communications protocol messages from the multimedia device to the automated voice markup language interpreter on the voice server.

The method of FIG. 6 also includes providing (310), by the multimodal application to an automated voice markup language interpreter, speech for recognition from a user. That is, the multimodal device acquires user speech as an analog audio signal from a microphone and digitizes the speech according to a codec. The multimodal application then provides the digitized speech to the automated voice markup language interpreter, through API calls if the interpreter is on the multimodal device, through data communications protocol messages if the interpreter is on a network voice server.

The method of FIG. 6 also includes matching (312), by the automated voice markup language interpreter with an enabled grammar, at least part of the speech for recognition. The interpreter receives the digitized speech, passes it to an ASR engine, and receives text words in response. The interpreter then determines whether any of the text words match, in value and in sequence, words in enabled grammars.

The method of FIG. 6 also includes returning (314), from the automated voice markup language interpreter to the multimodal application, an event indicating an instruction representative of the matched speech. If the interpreter matches a word or sequence of words with an enabled grammar, the interpreter returns an event to an event listener in the multimodal application. If the interpreter is on the multimodal device with the multimodal application, the event is returned from an API call to a DOM object that corresponds to the element at which the event is targeted. If the interpreter is on a network voice server, the event is first passed back to the multimodal device in a data communications protocol message before being directed to the corresponding DOM object.

In view of the explanations set forth above in this document, readers will recognize that enabling grammars in web page frames according to embodiments of the present invention provides the benefits of:

enabling grammars that voice-enable content navigation for all frames of a display, and targeting of a particular target frame when voice is used to activate a hyperlink.

Exemplary embodiments of the present invention are described here largely in the context of a fully functional computer system for enabling grammars in web page frames. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone data communications networks for voice communications and digital data communications data communications networks such as, for example, Ethernets™ and data communications networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of enabling grammars in web page frames, the method comprising:
   receiving, in a multimodal application on a multimodal device, a frameset document, the frameset document comprising markup defining web page frames;
   obtaining, by the multimodal application, content documents for display in each of the web page frames, the content documents comprising navigable markup elements;
   generating, by the multimodal application, for each navigable markup element in each content document, a segment of markup that defines a speech recognition grammar and identifies content to be displayed when words in the grammar are matched; and
   enabling, by the multimodal application, all of the generated grammars so that any of the generated grammars is usable for speech recognition at any one time.

2. The method of claim 1, wherein the web page frames are organized in a hierarchy according to one or more framesets, the hierarchy characterized by a topmost frame and one or more child frames, and wherein obtaining the content documents further comprises iteratively obtaining, for the topmost frame and for each child frame, a separate content document for display in each frame.

3. The method of claim 1, wherein enabling the generated grammars comprises:
   dynamically generating a markup language fragment specifying a grammar; and
   providing the markup language fragment to an automated voice markup language interpreter.

4. The method of claim 1, wherein:
   the multimodal device further comprises an automated voice markup language interpreter; and
   enabling the generated grammars further comprises providing the grammars to the automated voice markup language interpreter by one or more application programming interface ('API') calls from the multimodal application to the automated voice markup language interpreter.

5. The method of claim 1, wherein:
   the multimodal device is coupled for data communications to a voice server, the voice server comprising an automated voice markup language interpreter; and
   enabling all the generated grammars further comprises providing the grammars to the automated voice markup language interpreter via one or more data communications protocol messages from the multimodal device to the automated voice markup language interpreter on the voice server.

6. The method of claim 1, further comprising:
   providing, by the multimodal application to an automated voice markup language interpreter, speech for recognition from a user;
   matching, by the automated voice markup language interpreter with an enabled grammar, at least part of the speech for recognition; and
   returning, from the automated voice markup language interpreter to the multimodal application, an event indicating an instruction representative of the matched speech.

7. At least one computer-readable storage medium having instructions encoded thereon which, when executed, perform a method comprising:
   receiving, in a multimodal application on a multimodal device, a frameset document, the frameset document comprising markup defining web page frames;
   obtaining, by the multimodal application, content documents for display in each of the web page frames, the content documents comprising navigable markup elements;
   generating, by the multimodal application, for each navigable markup element in each content document, a segment of markup that defines a speech recognition grammar and identifies content to be displayed when words in the grammar are matched; and enabling, by the multimodal application, all the generated grammars so that any of the generated grammars is usable for speech recognition at any one time.

8. The at least one computer-readable storage medium of claim 7, wherein:
the web page frames are organized in a hierarchy according to one or more framesets, the hierarchy characterized by a topmost frame and one or more child frames; and
obtaining at least two content documents further comprises iteratively obtaining, for the topmost frame and for each child frame, a separate content document for display in each frame.

9. The at least one computer-readable storage medium of claim 7, wherein enabling the generated grammars comprises:
dynamically generating a markup language fragment specifying a grammar; and
providing the markup language fragment to an automated voice markup language interpreter.

10. The at least one computer-readable storage medium of claim 7, wherein:
the multimodal device further comprises an automated voice markup language interpreter; and
enabling the generated grammars further comprises providing the grammars to the automated voice markup language interpreter via one or more application programming interface ('API') calls from the multimodal application to the automated voice markup language interpreter.

11. The at least one computer-readable storage medium of claim 7, wherein the multimodal device is coupled for data communications to a voice server, the voice server comprising an automated voice markup language interpreter, and wherein enabling the generated grammars comprises providing the grammars to the automated voice markup language interpreter via one or more data communications protocol messages from the multimodal device to the automated voice markup language interpreter on the voice server.

12. The at least one computer-readable storage medium of claim 7, wherein the method comprises:
providing, by the multimodal application to an automated voice markup language interpreter, speech for recognition from a user;
matching, by the automated voice markup language interpreter with an enabled grammar, at least part of the speech for recognition; and
returning, from the automated voice markup language interpreter to the multimodal application, an event indicating an instruction representative of the matched speech.

* * * * *